(12) United States Patent
Ignomirello et al.

(10) Patent No.: US 9,817,728 B2
(45) Date of Patent: Nov. 14, 2017

(54) FAST SYSTEM STATE CLONING

(71) Applicant: Symbolic IO Corporation, Holmdel, NJ (US)

(72) Inventors: Brian M. Ignomirello, Holmdel, NJ (US); Suihong Liang, Holmdel, NJ (US)

(73) Assignee: Symbolic IO Corporation, Holmdel, NJ (US)

( * ) Notice: Subject to any disclaimer, the term of this patent is extended or adjusted under 35 U.S.C. 154(b) by 0 days.

(21) Appl. No.: 15/089,837

(22) Filed: Apr. 4, 2016

(65) Prior Publication Data

US 2016/0217047 A1   Jul. 28, 2016

Related U.S. Application Data (63) Continuation-in-part of application No. 14/804,175, filed on Jul. 20, 2015, now Pat. No. 9,304,703, and a
(Continued)

(51) Int. Cl.
  *G06F 11/14* (2006.01)
  *G06F 21/62* (2013.01)

(52) U.S. Cl.
  CPC ...... *G06F 11/1469* (2013.01); *G06F 11/1451* (2013.01); *G06F 11/1464* (2013.01);
(Continued)

(58) Field of Classification Search
  CPC ............. G06F 11/1464; G06F 11/1469; G06F 11/1451; G06F 21/62
(Continued)

(56) References Cited

U.S. PATENT DOCUMENTS 3,016,527 A   1/1962   Gilbert et al.
4,183,464 A   1/1980   Babb
(Continued)

FOREIGN PATENT DOCUMENTS

JP   H07-504541 A   5/1995
JP   2000-31831 A   1/2000
(Continued)

OTHER PUBLICATIONS

Smith, Steven W. "Data compression tutorial: Part 1," EE Times, Jun. 14, 2007, 6 pages.*
(Continued)

*Primary Examiner* — Kris Mackes
*Assistant Examiner* — Tiffany Bui
(74) *Attorney, Agent, or Firm* — Knobbe, Martens, Olson & Bear, LLP (57) ABSTRACT

A system and method to create a clone of a source computing system, the system including the steps of selecting a memory space coupled to the source computing system, retrieving uncoded data from the selected memory space, encoding the uncoded data by use of a bit-marker-based encoding process executing on a backup server, storing encoded data in a protected memory coupled to the backup server, wherein the protected memory is protected from a power interruption, retrieving the encoded data from the protected memory; and decoding the encoded data onto a target computing system, wherein the target computing system is separate from the source computing system.

20 Claims, 6 Drawing Sheets

Related U.S. Application Data continuation-in-part of application No. 13/908,239, filed on Jun. 3, 2013, now Pat. No. 9,467,294, which is a continuation-in-part of application No. 13/797,093, filed on Mar. 12, 2013, and a continuation-in-part of application No. 13/756,921, filed on Feb. 1, 2013.

(60) Provisional application No. 62/148,160, filed on Apr. 15, 2015, provisional application No. 62/202,983, filed on Aug. 10, 2015.

(52) U.S. Cl.
CPC ........ *G06F 21/62* (2013.01); *G06F 2201/805* (2013.01); *G06F 2201/84* (2013.01)

(58) Field of Classification Search
USPC ............................................................ 707/640
See application file for complete search history.

(56) References Cited

U.S. PATENT DOCUMENTS

| | | | |
|---|---|---|---|
| 4,286,256 A | 8/1981 | Langdon, Jr. et al. | |
| 4,560,977 A | 12/1985 | Murakami et al. | |
| 4,635,141 A | 1/1987 | Coulter | |
| 5,300,930 A | 4/1994 | Burger et al. | |
| 5,748,921 A | 5/1998 | Lambrecht et al. | |
| 5,818,877 A | 10/1998 | Tsai et al. | |
| 5,867,180 A | 2/1999 | Katayama et al. | |
| 5,872,530 A | 2/1999 | Domyo et al. | |
| 5,878,240 A | 3/1999 | Tomko | |
| 5,923,860 A | 7/1999 | Olarig | |
| 6,052,785 A | 4/2000 | Lin et al. | |
| 6,243,831 B1 | 6/2001 | Mustafa et al. | |
| 6,297,753 B1 | 10/2001 | Hayami | |
| 6,310,564 B1 | 10/2001 | Fujimoto | |
| 6,465,969 B1 | 10/2002 | Murasko et al. | |
| 6,560,599 B1 | 5/2003 | Boa et al. | |
| 6,614,369 B1 | 9/2003 | Widmer | |
| 6,621,935 B1 | 9/2003 | Xin et al. | |
| 6,674,908 B1 | 1/2004 | Aronov | |
| 6,785,815 B1 | 8/2004 | Serret-Avila et al. | |
| 6,829,695 B1 | 12/2004 | Ross | |
| 7,174,436 B1 | 2/2007 | Langendorf et al. | |
| 7,231,560 B2 | 6/2007 | Lai et al. | |
| 7,290,116 B1 | 10/2007 | Grohoski et al. | |
| 7,356,679 B1 | 4/2008 | Le et al. | |
| 7,363,331 B2 | 4/2008 | Karasudani et al. | |
| 7,587,408 B2 | 9/2009 | Snapp et al. | |
| 7,620,784 B2 | 11/2009 | Panabaker | |
| 7,822,946 B2 | 10/2010 | Sharma | |
| 7,921,088 B1 | 4/2011 | Mittal | |
| 7,930,473 B2 | 4/2011 | Rajan et al. | |
| 7,991,941 B2 | 8/2011 | Fortin | |
| 7,996,361 B1 | 8/2011 | Shah et al. | |
| 8,009,069 B2 | 8/2011 | Chen et al. | |
| 8,078,789 B2 | 12/2011 | Hinrichs | |
| 8,117,028 B2 | 2/2012 | Murashima | |
| 8,164,490 B2 | 4/2012 | Itani | |
| 8,200,923 B1 | 6/2012 | Healey et al. | |
| 8,214,425 B2 | 7/2012 | Provencal | |
| 8,237,594 B2 | 8/2012 | Suzuki et al. | |
| 8,589,643 B2 | 11/2013 | Meyer et al. | |
| 8,601,201 B2 | 12/2013 | Scannell et al. | |
| 8,639,849 B2 | 1/2014 | Achler | |
| 8,832,352 B2 | 9/2014 | Tsirkin et al. | |
| 8,839,112 B2 | 9/2014 | Neerudu et al. | |
| 8,938,643 B1 | 1/2015 | Karmarkar et al. | |
| 2002/0122597 A1* | 9/2002 | Kikuchi | H04N 1/32614 382/232 |
| 2002/0172203 A1 | 11/2002 | Ji et al. | |
| 2003/0018759 A1 | 1/2003 | Baumann | |
| 2003/0115447 A1 | 6/2003 | Pham et al. | |
| 2003/0122694 A1 | 7/2003 | Green | |
| 2004/0143733 A1 | 7/2004 | Ophir et al. | |
| 2005/0198076 A1 | 9/2005 | Stata et al. | |
| 2005/0288800 A1 | 12/2005 | Smith et al. | |
| 2006/0171050 A1 | 8/2006 | Hanson et al. | |
| 2006/0212644 A1* | 9/2006 | Acton | G06F 1/30 711/103 |
| 2006/0248273 A1 | 11/2006 | Jernigan et al. | |
| 2006/0256866 A1* | 11/2006 | Ziauddin | H04N 19/51 375/240.15 |
| 2007/0101074 A1 | 5/2007 | Patterson | |
| 2007/0291934 A1 | 12/2007 | Volkovs et al. | |
| 2008/0062020 A1 | 3/2008 | Lakus-Becker | |
| 2008/0077586 A1 | 3/2008 | Lam | |
| 2008/0133835 A1 | 6/2008 | Zhu et al. | |
| 2009/0112880 A1 | 4/2009 | Oliveira et al. | |
| 2009/0115646 A1 | 5/2009 | Duxbury | |
| 2009/0129691 A1 | 5/2009 | Luttmer et al. | |
| 2009/0169001 A1 | 7/2009 | Tighe et al. | |
| 2009/0300301 A1 | 12/2009 | Vaghani | |
| 2009/0307251 A1 | 12/2009 | Heller et al. | |
| 2010/0162039 A1* | 6/2010 | Goroff | G06F 11/1451 714/6.12 |
| 2010/0169287 A1 | 7/2010 | Klose | |
| 2010/0250501 A1 | 9/2010 | Mandagere et al. | |
| 2010/0306294 A1 | 12/2010 | Schneider | |
| 2011/0035361 A1* | 2/2011 | Soga | G06F 11/1469 707/675 |
| 2011/0107112 A1 | 5/2011 | Resch | |
| 2011/0276771 A1 | 11/2011 | Tajima et al. | |
| 2011/0289294 A1* | 11/2011 | Maeda | G06F 21/74 711/163 |
| 2012/0124282 A1 | 5/2012 | Frank et al. | |
| 2012/0131293 A1 | 5/2012 | Benhase et al. | |
| 2012/0159282 A1 | 6/2012 | Ito | |
| 2012/0166448 A1 | 6/2012 | Li et al. | |
| 2012/0166757 A1 | 6/2012 | Volvovski et al. | |
| 2012/0191982 A1* | 7/2012 | Levin | G06F 21/78 713/189 |
| 2012/0239860 A1 | 9/2012 | Atkisson et al. | |
| 2012/0278382 A1* | 11/2012 | Faith | G06F 3/064 709/203 |
| 2012/0303359 A1 | 11/2012 | Mizuguchi et al. | |
| 2012/0330894 A1 | 12/2012 | Slik | |
| 2013/0013618 A1 | 1/2013 | Heller et al. | |
| 2013/0019076 A1* | 1/2013 | Amidi | G06F 11/1441 711/162 |
| 2013/0111166 A1 | 5/2013 | Resch et al. | |
| 2013/0212161 A1* | 8/2013 | Ben-Shaul | G06F 9/4451 709/203 |
| 2013/0283038 A1* | 10/2013 | Kulkarni | H04L 63/065 713/153 |
| 2014/0082324 A1 | 3/2014 | Elhamias et al. | |
| 2014/0223118 A1 | 8/2014 | Ignomirello | |
| 2014/0223196 A1 | 8/2014 | Ignomirello | |
| 2014/0259014 A1* | 9/2014 | Watanabe | G06F 9/5077 718/1 |
| 2014/0279911 A1 | 9/2014 | Ignomirello | |
| 2014/0297938 A1 | 10/2014 | Puthiyedath et al. | |
| 2015/0324388 A1 | 11/2015 | Benke et al. | |

FOREIGN PATENT DOCUMENTS

| | | |
|---|---|---|
| JP | 2007-281763 A | 10/2007 |
| JP | 2008-107615 A | 5/2008 |
| JP | 2010-512057 A | 4/2010 |
| JP | 2012-80470 A | 4/2012 |
| JP | 2012-129785 A | 7/2012 |
| WO | 2006042019 A2 | 4/2006 |
| WO | 2014/121102 A2 | 8/2014 |
| WO | 2014/170617 A1 | 10/2014 |
| WO | 2015039181 A1 | 3/2015 |

OTHER PUBLICATIONS

Intel, "Intel 64 and IA-32 Architectures Optimization Reference Manual", manual, Sep. 2014, 642 pages.
Xilinx Inc, "Virtex-5 Family Overview", Feb. 6, 2009, 13 pages.

(56) References Cited

OTHER PUBLICATIONS

Gilbert, "The Bus (PCI and PCI-Express)", retrieved from http://www.yale.edu/pcIt/PCHW/BUS.HTM on Apr. 28, 2015 dated Jan. 4, 2008, 5 pages.

Oracle Corp, "I/O Domains and PCI Express Buses", retrieved from docs.oracle.com/cd/E1960401/8210406/configurepciexpressbusesacrossmultipleldoms/index.html on Apr. 28, 2015, 3 pages.

Hardware Secrets, "Everything You Need to Know About the PCI Express", retrieved from http://www.hardwaresecrets.com/article/EverythingYouNeedtoKnowAboutthePCIExpress/190 on Jul. 12, 2012, 3 pages.

International Computer Concepts Inc, "PCI & PCIe Overview/Comparison", retrieved from https://www.ccusa.com/comparepci/ on Apr. 28, 2015, 5 pages.

Wylie et al., "Selecting the right data distribution scheme for a survivable storage system", CMU-CS-01-120, Carnegie Mellon University, retrieved from http://www.pdl.cmu.edu/PDL-FTP/Storage/CMU-CS-01-120.pdf, dated May 2001, 23 Pages.

Saduqulla et al.,"Threshold Proxy Re-Encryption in Cloud Storage System, International Journal of Advanced Research in Computer Science and Software Engineering", vol. 3, Issue 11, retrieved from http://www.ijarcsse.com/docs/papers/Volume_3/11_November2013/V3I11-0332.pdf, dated Nov. 2013, 5 Pages.

"Disk Cloning and Mass System Deployment" retrieved from http://www.drive-image.com/Disk_Cloning_and_Mass_System_Deployment.shtml, 21 Pages.

"Ntfsclone—Efficiently clone, image, restore or rescue an NTFS", Ubuntu, retrieved from http://manpages.ubuntu.com/manpages/gutsy/man8/ntfsclone.8.html, 4 Pages.

Sun Microsystems, Best Practices for Sun StorEdge 6920 System (Nov. 2004), 56 pages.

Seagate, SCSI Commands Reference Manual (Feb. 14, 2006), 362 pages.

Makatos, Thano, et al., ZBD: Using Transparent Compression at the Block Level to Increase Storage Space Efficiency, IEEE Computer Society pp. 61-70 (2010), 10 pages.

Tate, Jon, et al., Real-time Compression in SAN Volume Controller and the Storwize V 7000, IBM (Aug. 17, 2012), 364 pages.

Lillibridge, M., Eshghi, K., Bhagwat, D., Deolalikar, V., Trezise, G., and Camble, P. 2009. Sparse indexing: Large Scale, inline deduplication using sampling and locality. In Proceedings of the 7th USNIX Conference on File and Storage Technologies (FAST), USENIX Association, Berkeley, CA, 111-123, 13 pages.

International Search Report and Written Opinion dated Aug. 20, 2014 issued in connection with International Application No. PCT/US2014/014209, 5 pages.

International Search Report and Written Opinion dated Jan. 16, 2015 issued in connection with International Application No. PCT/US2014/014225, 2 pages.

International Preliminary Report on Patentability dated Aug. 13, 2015 issued in connection with International Application No. PCT/US2014/014209, 8 pages.

International Preliminary Report on Patentability dated Aug. 13, 2015 issued in connection with International Application No. PCT/US2014/014225, 7 pages.

Symbolic IO Corporation, International Search Report and Written Opinion dated May 3, 2016 for PCT/US16/25988, 8 pages.

European Search Report dated Sep. 5, 2016 in connection with corresponding EP Patent Application No. 16165443.9 (9 pages total).

CM Liu: "Dictionary Techniques Contents", National Chiao-Tung University Website, Dec. 31, 2010 (Dec. 31, 2010), XP055297596, Retrieved from the Internet: http://people.cs.nctu.edu.tw/~cmliu/Courses/Compression/chap5.pdf [retrieved on Aug. 25, 2016] (137 pages total).

Anonymous: "Find seed from random numbers", Blitz Research Programming Forums, Dec. 4, 2011 (Dec. 4, 2011), XP055297586, Retrieved from the Internet: http://web.archive.org/web/20111204053405/http://blitzbasic.com/Community/posts.php?topic=61025 (5 pages total).

Japanese Office Action dated Sep. 20, 2016, issued in connection with corresponding Japanese Patent Application No. 2016-080683 with English Language translation (8 pages total).

Extended European Search Report for corresponding European Application No. 14745756.8 dated Sep. 26, 2016, 9 Pages.

Extended European Search Report for corresponding European Application No. 14745861.6 dated Aug. 19, 2016, 9 Pages.

Anonymous: "Huffman coding", Wikipedia, the free encyclopedia, Jan. 18, 2013, pp. 1-10, XP055303125, Retrieved from the Internet: https://enwikipedia.org/w/index.phptitle=Huffmancoding&oldid=533661878 [retrieved on Sep. 15, 2016] (10 pages total).

Anonymous: "Zero suppression", Wikipedia, the free encyclopedia, Jul. 25, 2012, XP055303438, Retrieved from the Internet: https://enwikipedia.org/w/index.php?title=Zero suppression&0ldid=504088023 [retrieved on Sep. 16, 2016] (2 pages total).

Smith, "Data compression tutorial: Part 1," EE Times, Jun. 14, 2007, 6 pages.

Japanese Office Action dated Mar. 14, 2017, issued in connection corresponding JP Application No. 2016-080683 (9 pages total).

\* cited by examiner

FAST SYSTEM STATE CLONING

CROSS-REFERENCE TO RELATED APPLICATIONS

This application is a continuation in part of U.S. patent application Ser. No. 14/804,175, filed on Jul. 20, 2015, which in turn claims the benefit of U.S. Provisional Patent Application Ser. No. 62/148,160, filed on Apr. 15, 2015. This application also is a continuation in part of U.S. patent application Ser. No. 13/908,239, filed Jun. 3, 2013, which in turn is a continuation-in-part both of application Ser. No. 13/797,093, filed on Mar. 12, 2013, and of application Ser. No. 13/756,921, filed on Feb. 1, 2013. This application also claims the benefit of U.S. Provisional Patent Application Ser. No. 62/202,983, filed on Aug. 10, 2015. The entire disclosure of each of the afore-referenced priority applications is incorporated by reference into the instant specification.

BACKGROUND

Field

Embodiments of the present invention generally relate to system cloning and, in particular, to a fast apparatus and method to clone a system for backup or replication.

Description of Related Art

Computer systems of varying scopes or deployment are used throughout a typical large enterprise. Enterprise-level computer systems are systems that may be used throughout an enterprise or to support enterprise-critical functions. For example, for an airline company, a reservation and booking system or a flight scheduling system may be an enterprise-level system. At a lower level of deployment, other systems (e.g., a department-level or functional-level system) may support a departmental-level organization or support a limited function. For example, department-level systems for an airline company may support one of accounting, sales and marketing, engineering, maintenance support, and so forth. At an even lower level, a computer system (either a real system or a virtual system such as a cloud-based system) may support individual employees.

A computer system may be characterized by its hardware and software assets, status, system state, and the like. Hardware characterization may include a list of servers used, memory and memory storage space available, communication links available, router connectivity, and so forth. Characterization of software assets may include a list of operating systems and application programs available on each server. Characterization of system state may include a list of what software is presently executing on each server, the state of each software (e.g., as indicated by a finite state machine model), data in volatile and non-volatile memory accessible to and/or used by each software, and so forth.

At times, it is necessary or desirable to clone a computer system, e.g., for backup or capacity purposes. For example, a backup of a computer system may be made by cloning all or part of the computer system, e.g., cloning at least the system state but not necessarily the hardware characterization. On the other hand, cloning by way of replication may be made when it is necessary to quickly ramp up processing capacity or capabilities. For example, an online retail merchant may want to replicate temporarily its computer systems devoted to sales and marketing during the period from Thanksgiving to Christmas, and release those assets later. However, the online retail merchant may want to replicate temporarily its computer systems devoted to accounting at the end of its fiscal year.

At times, it is necessary or desirable to restore a computer system from backups. For example, if a sales system or web site of an online merchant crashes, the merchant may not have any sales until the sales system or web site is restored. Therefore, there would be a need to restore such systems from backups as soon as possible.

Existing methods for cloning systems suffer from a variety of drawbacks. For example, a hot standby (e.g., a system that is constantly active and mirroring the state of a primary system) may be expensive in terms of hardware required, software licenses needed and maintenance cost (e.g., for utilities and staff), particularly for larger systems. Multiple virtual machines and hypervisors are also potentially expensive in terms of hardware and software if they are constantly kept hot. Cold standby backup systems (e.g., a backup brought online only when needed, such as upon primary system failure) may take an undesirably long time to take over for a failed system, and may not reflect the most recent state of the primary system prior to failure.

Therefore, a need exists to provide a system and method to clone computer systems quickly yet at low cost.

BRIEF SUMMARY

In one embodiment, a system clone is made by copying all or part of the present memory contents of an application server system, using fast methods and architecture described herein. The system clone then may be used as a backup, to increase enterprise capacity, to repurpose computing assets, and so forth.

A method to clone a source computing system in accordance with an embodiment of the present disclosure may include the steps of selecting a memory space coupled to the source computing system, retrieving uncoded data from the selected memory space, encoding the uncoded data by use of a bit-marker-based encoding process executing on a backup server, storing encoded data in a protected memory coupled to the backup server, wherein the protected memory is protected from a power interruption, retrieving the encoded data from the protected memory, and decoding the encoded data onto a target computing system, wherein the target computing system is separate from the source computing system.

A system to clone a source computing system in accordance with an embodiment of the present disclosure may include a processor coupled to a memory, the memory providing a memory space for the source computing system, a communication interface to support retrieval of uncoded data from the memory space, an encoder to encode the uncoded data by use of a bit-marker-based encoding process executing on a backup server, a storage module to store encoded data in a protected memory coupled to the backup server, wherein the protected memory is protected from a power interruption, a communication interface to support retrieval of the encoded data from the protected memory, and a decoder to decode the encoded data onto a target computing system, wherein the target computing system is separate from the source computing system.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with exemplary use cases, method embodiments, and system embodiments. Although well suited for use with, e.g., a system using servers, networking equipment and/or specialized instrumentation, the disclosure is not limited to use with any particular type of electronic system or configuration of system elements. Those skilled in the art will recognize that the disclosed techniques may be used in any electronic system in which it is desirable to replicate, clone, backup or restore a computer system.

Embodiments in accordance with the present disclosure will be described in relation to associated hardware. However, to avoid unnecessarily obscuring the present disclosure, the following description omits well-known structures, components and devices that may be shown in block diagram form, are well known, or are otherwise summarized. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

A module that performs a function also may be referred to as being configured to perform the function, e.g., a data module that receives data also may be described as being configured to receive data. Configuration to perform a function may include, for example: providing and executing computer code that performs the function; providing provisionable configuration parameters that control, limit, enable or disable capabilities of the module (e.g., setting a flag, setting permissions, setting threshold levels used at decision points, etc.); providing a physical connection, such as a jumper to select an option, or to enable/disable an option; attaching a physical communication link; enabling a wireless communication link; providing electrical circuitry that is designed to perform the function without use of a processor, such as by use of discrete components and/or non-CPU integrated circuits; energizing a circuit that performs the function (e.g., providing power to a transceiver circuit in order to receive data); and so forth.

The parent of the present patent application (U.S. patent application Ser. No. 14/804,175, "the '175 Application") discloses a system for a high-capacity and fast transfer rate digital storage. Bit marker technology used in the '175 Application and herein is described in CIP parent application U.S. patent application Ser. No. 13/908,239 ("the '239 Application). When a computer system can be characterized at least in part by a digital state of its software assets, status and system state, then embodiments in accordance with the present disclosure may use the system of the parent disclosure in order to clone a digital state very quickly. System restoral may be performed commensurately quickly.

The methods, components and systems disclosed in the '175 Application and used in the present embodiments include a hypervisor, a server processor, a customized operating system and/or a guest operating systems (OSs) in the hypervisor, data or drives associated with the guest OSs. Embodiments are able to integrate into substantially any network via networking components (e.g., Ethernet adapters). Embodiments may further include conventional RAM volatile memory, and a non-volatile DIMM memory (NV-DIMM) that is protected from data loss as disclosed in the '175 Application. Systems may further include PCIe, peripheral devices and structuring.

The data being imaged and represented may include substantially any data stored in the volatile RAM, e.g., databases, application programs, logs, proprietary data, and so forth. Application programs may include: various services executing at an operating system level such as a firewall service, a document service, etc.; various software executing at a user level such as a spreadsheet, word processor, graphics editing, CAD/CAM software, accounting software, etc.; and various servers, such as a web server, a mail server, a database server, and so forth.

Figure 1:
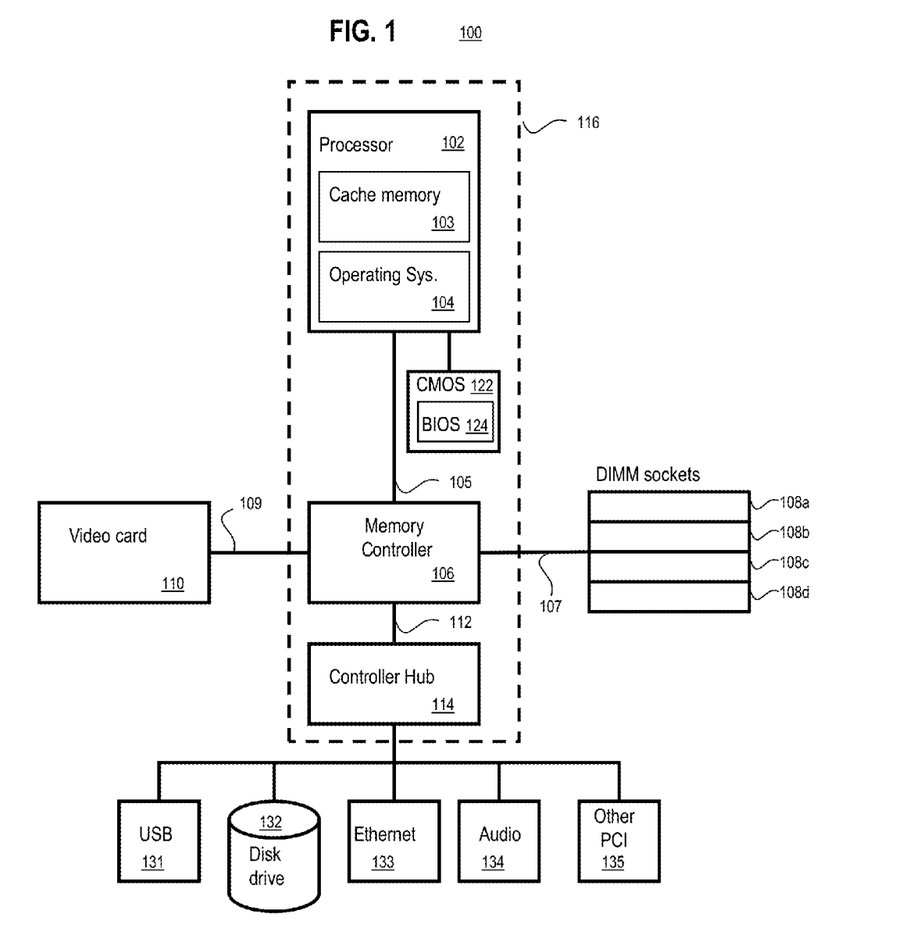
FIG. 1 illustrates a functional block diagram of a personal computer (PC) based server as known in the art.

FIG. 1 illustrates a functional block diagram of a conventional computer system 100 as known in the art. System 100 may be used, for example, in a computer system based upon an Intel®-compatible architecture. As fabrication technology advances, various functional components may be fabricated in different integrated circuit (IC) configurations, depending upon factors such as generation of chipset, price-to-performance ratio of the targeted customer, targeted computing platform (e.g., mobile devices, servers, etc.), and so forth. Certain functions may be combined into various configurations such as in a single IC, such as an IC 116.

System 100 includes a processor 102, which may be a general-purpose processor such as Xeon®, Intel Core i7®, i5®, i3®, or processors from Advanced Micro Devices® (AMD) such as Athlon64®, and the like. In other embodiments, processor 102 may be a graphics processing unit (GPU). In the functional block diagram of FIG. 1, processor 102 as used herein may refer to the functions of a processor, and/or refer to the one or more hardware cores of a processor. Processor 102 may include multiple processing cores that operate at multi-GHz speeds. Processor 102 may include a cache memory 103 (e.g., L1 or L2 cache). Processor 102 also may be programmed or configured to include an operating system 104. Examples of operating system 104 include various versions of Windows®, Mac OS®, Linux®, and/or operating systems or operating system extensions in accordance with an embodiment of the present disclosure, and so forth. The registered trademark Windows is a trademark of Microsoft Inc. The registered trademark Mac OS is a trademark of Apple Inc. The registered trademark Linux is used pursuant to a sublicense from LMI, the exclusive licensee of Linus Torvalds, owner of the mark on a world-wide basis. Operating system 104 performs conventional functions that include the running of an application program (not shown in FIG. 1). Functionally, operating system 104 is illustrated as being a part of processor 102, but portions of operating system 104 may physically reside in a non-volatile memory (e.g., a hard disk, solid-state drive (SSD), flash drive, NAND memory, non-volatile RAM, etc.), not illustrated in FIG. 1, and at least portions of operating system 104 may be read into RAM memory as needed for execution by processor 102.

Processor 102 may use several internal and external buses to interface with a variety of functional components. System 100 includes communication bus 105 that links processor 102 to memory controller 106. Memory controller 106 may also be referred to as a northbridge. Communication bus 105 may be implemented as one of a front side bus (FSB), a Non-Uniform Memory Access (NUMA) bus, an EV6 bus, a Peripheral Component Interconnect (PCI) bus, and so forth.

System 100 further includes a nonvolatile memory 122 (e.g., a CMOS memory) coupled to processor 102. CMOS memory 122 may include a basic input/output system (BIOS) 124, which helps manage low-level communication among computer components, and may include storage of computer code to perform a power-on self-test. Conventionally, a power-on self-test may include a test of the data integrity of installed RAM.

Memory controller hub 106 typically handles communications between processor 102 and various high-speed functional components such as external RAM memory installed in dual in-line memory module (DIMM) slots 108a, 108b via communication bus 107, and video graphics card 110 via communication bus 109. Communication buses 107 and 109 may be high-speed interfaces, such as Peripheral Component Interconnect Express (PCIe) or Accelerated Graphics Port (AGP). Memory controller hub 106 may also handle communications between processor 102 and controller hub 114, via communication bus 112. Controller hub 114 may also be known by other names such as a southbridge, an I/O Controller Hub (ICH), a Fusion Controller Hub (FCH), a Platform Controller Hub (PCH), and so forth. Controller hub 114 in turn manages further communication with additional and/or slower I/O devices or interfaces such as USB ports 131, storage media 132 with standard interfaces (e.g., ATA/SATA, mSATA, SAS, etc.), Ethernet transceivers 133, audio ports 134, other PCI devices 135, and so forth.

In some configurations of system 100 (not illustrated), processor 102 is designed to bypass memory controller 106 and communicate directly with controller hub 114 via a Direct Media Interface (DMI). Such configurations also may integrate the functions of processor 102 and memory controller 106 into a single IC 116. In such configurations, controller hub 114 is typically a Platform Controller Hub (PCH).

Although the memory chips that make up RAM memory installed in DIMM slots 108a, 108b may have a very high maximum access speed (e.g., about 57 GBytes/sec), communication bus 109 normally cannot support such fast speeds. For example, the speed of PCIe 4.0 in a 16-lane slot is limited to 31.508 GBytes/sec. AGP is slower still than PCIe. Therefore, communication bus 107 is a bottleneck that prevents faster memory access.

The bottleneck of memory access is one drawback of the conventional art. Other drawbacks described above of a conventional computer include the mismatch in storage size between the size of RAM memory (typically on the order of a few Gbytes) and the storage size of a conventional hard disk (typically on the order of a few Tbytes), and the relatively small storage size of RAM memory to the storage size of a conventional hard disk. Another drawback of the conventional art is the volatile nature of the RAM memory.

Embodiments in accordance with the present disclosure break the density issue that RAM has today. Embodiments in accordance with the present disclosure address these drawbacks of the conventional art by providing a novel hardware interface for storage units, and a novel driver interface for the hardware interface.

Outside of the CPU, RAM is the fastest element in x86 and x64 computing systems, so embodiments allows for the alignment of today's high speed RAM performance with a new method of achieving high storage density. As this effect is applied, it completely changes the cost paradigm and allows low cost memory modules to replace the need for high-density, high cost memory modules.

A remaining issue is the volatility of standard memory modules. Since all RAM is volatile, it does not lend itself to becoming a long-term storage medium. Embodiments are similar to but differ from non-volatile RAM (NVRAM) technology, which circumvents the volatility issue found in standard DIMM devices.

Embodiments in accordance with the present disclosure use a basic inexpensive x64 motherboard that can be powered by Intel® or AMD® CPU processors. The motherboard has a modified CME and BIOS that gives it the intelligence required to be Non-Volatile Memory aware. In addition, the motherboard provides to each memory module a DC supply voltage (e.g., 1.2 v, 1.35 v, 1.5 v, etc.) that may be used to charge environmentally-safe low-load, slow-drain capacitors. This design allows for shutdown state (e.g., loss of power or safe shutdown) to maintain data persistence within the memory module, thus making the memory module a viable long-term storage device.

Figure 2:
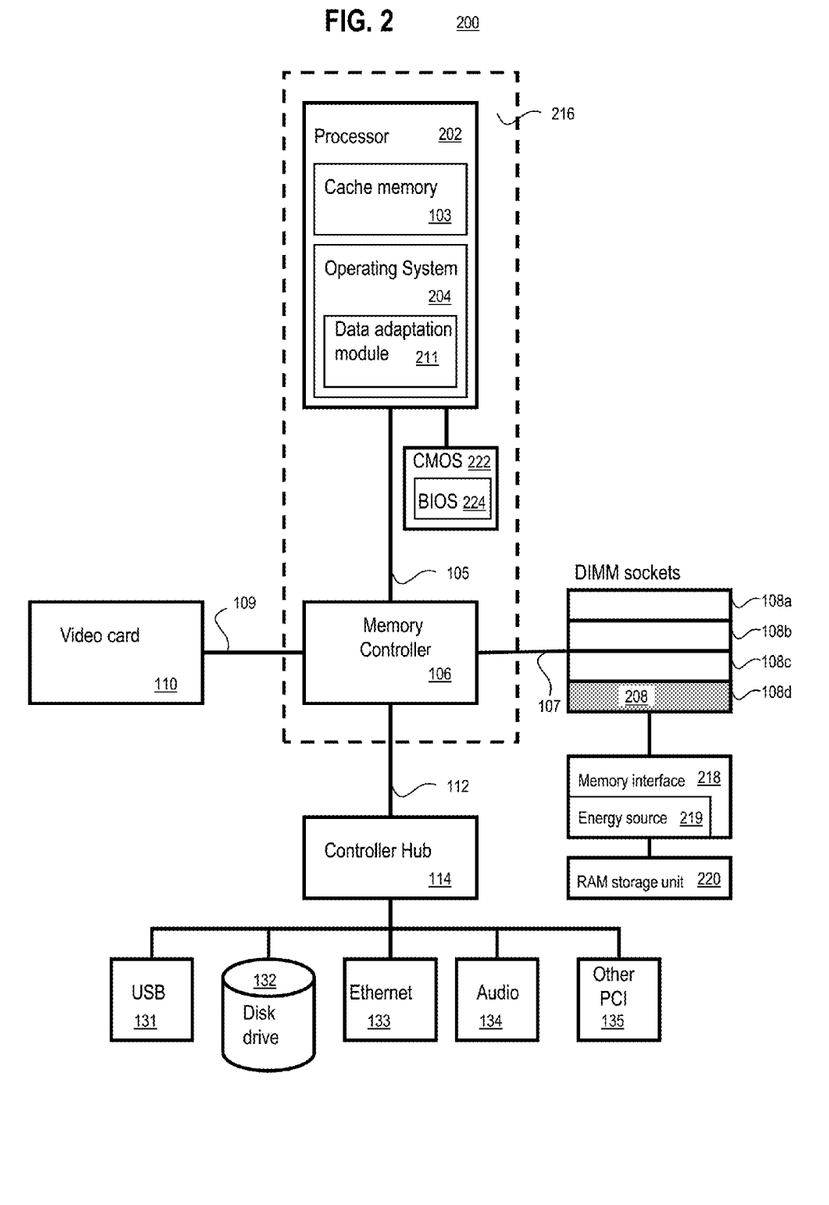
FIG. 2 illustrates a functional block diagram of a PC-based cloning server in accordance with an embodiment of the present disclosure.

FIG. 2 illustrates a functional block diagram of a computer system 200 in accordance with an embodiment of the present disclosure. Computer system 200 may also be referred to herein as a blink server. Functional components already described in FIG. 1 are assigned in FIG. 2 the same reference number as that shown in FIG. 1. System 200 includes a memory interface 218, which may be physically coupled to a DIMM slot (e.g., DIMM slot 108b) by use of a connector 208 such as a Molex® connector. Memory interface 218 communicates with processor 202 through DIMM slot 108b by use of conventional protocols on communication bus 107. Memory interface 218 is coupled physically and communicatively to RAM storage unit 220. Functions of memory interface 218 include communicatively coupling RAM storage unit 220 to communication bus 107, monitoring for certain events like state of health related to RAM storage unit 220, other hardware events, taking certain actions based upon detected signals or hardware events, and so forth. Functions of memory interface 218 also may include simple processing and housekeeping functions such as resolving memory addresses, reporting memory size, I/O control, keeping track of and reporting total power cycles, run time in an hour, reporting number of DIMMs, reporting status such as ultra capacitor (cap) current voltage, bus ready, last restore success or failure, device ready, flash status of the NAND area, cap connected, cap charge status, valid image present, DIMM init performed, read registers, and so forth. NAND may be known as a type of non-volatile IC-based storage technology that does not require power to retain data.

System 200 further includes a nonvolatile memory 222 (e.g., a CMOS memory) coupled to processor 202. CMOS memory 222 may include a basic input/output system (BIOS) 224, which helps manage low-level communication among computer components, and may include storage of computer code to perform a power-on self-test. Conventionally, a power-on self-test may include a test of the data integrity of installed RAM. Embodiments in accordance with the present disclosure may include a modified power-on self-test (as compared to the power-on self-test of BIOS 124), such that the power-on self-test may skip the test for at least some predetermined memory modules, e.g., if the test would be incompatible with the nature of data stored in the predetermined memory module.

Embodiments in accordance with the present disclosure also address the RAM volatility shortcoming of the known art by coupling an energy source 219 with RAM storage unit 220. Energy source 219 may be incorporated with memory interface 218. Energy source 219 is a source of backup power, such that if an external power supply to RAM storage unit 220 is lost (e.g., by way of an AC power failure affecting the entire computing system 200, removal of a battery powering a mobile system 200, motherboard failure, etc.), energy source 219 may provide sufficient power in order to maintain integrity of data stored in RAM storage unit 220.

Embodiments in accordance with the present disclosure include random access memory (RAM) organized as a combination of traditional volatile memory and non-volatile RAM module memory (NV-DIMM). The NV-DIMM memory is disclosed in the parent U.S. patent application Ser. No. 14/804,175 ("the '175 Application"), e.g., as the RAM storage unit 220. The proportion of each type of memory of the whole that is installed in a system may vary from system to system. For example, the total memory size may be selected at installation to be within a range of 8 GB to 160 GB or more, organized in eight banks, with two of the banks configured as conventional RAM memory and six banks configured as NV-DIMM.

Embodiments in accordance with the present disclosure may provide a system that operates in two modes. In a first mode, the entire content or address range of a conventional volatile memory of a source system (either of the present system or of an external system) may be selected to be imaged and represented by use of the methods disclosed in the '175 Application, and the representation stored in the NV-DIMM memory. This image or representation may also be known as a reference image. Embodiments may be communicatively coupled to an external system by use of a high-speed communication link such as 100 Gigabit Ethernet conforming to the IEEE 802.3ba-2010 standard.

In a second mode in accordance with an embodiment of the present disclosure, a subset of the entire conventional volatile memory address range of a source system may be selected to be imaged and represented, e.g., only a portion of the conventional volatile memory that is actively being utilized by processing running on the system being imaged and represented. In another variation of this embodiment, a fixed range subset of the entire conventional volatile memory address range may be imaged and represented. The fixed range subset does not necessarily need to be contiguous. In another variation of this embodiment, the subset of the address range being imaged and represented may represent a virtual server. For example, if a single physical server (e.g., used by a business enterprise) hosts more than one virtual server (e.g., one each for several departments in the business enterprise), embodiments may image and represent some but not all of the virtual servers. Such a capability may be useful if, e.g., the functions performed by the different servers have different backup needs (e.g., a virtual server for the finance department vs. a virtual server for the customer support department).

In some embodiments, the NV-DIMM may act as a repository to store a plurality of reference images representing, e.g., a single system over time, or multiple external systems, or a combination thereof. An NV-DIMM repository of multiple reference images may be used to support disaster recovery, e.g., an off-site location securely storing reference images for multiple enterprises.

After the data has been imaged, represented and stored in NV-DIMM memory, embodiments in accordance with the present disclosure may provide an "infrastructure in a box" capability. For example, once all the databases, applications, logs, proprietary data, and so forth that had been imaged and represented is replicated on a target hardware environment that mimics the original hardware environment, the system that had been imaged and represented may be replicated along with the system state of the original system at the time it had been imaged and represented.

A replicated copy may be useful for backup purposes with fast restoration, or to be able to provide expanded capacity on short notice. Whether a restoration is deemed fast may vary from one field of use to another, or one content to another. For example, a fast restoration for a CAD/CAM system may not be deemed to be a fast restoration for a computing system supporting financial market trading. A fast restoration for a computing system providing video distribution of movies on demand may not be deemed to be a fast restoration for a computing system providing video distribution of a live event like the Super Bowl. Similarly, what notice is deemed to be short notice may vary from one field of use to another or one content to another, and may be as short as a few seconds or less for a computing system that supports financial market trading. In some embodiments, short notice is less than about five seconds notice. In some embodiments, a fast restoration can be completed within about ten minutes of the detection of a need for restoration or receipt of a command to perform a restoration. In other embodiments, a fast restoration can be completed within about three minutes. In other embodiments, a fast restoration can be completed within ten seconds or less.

Traditional backups are a relatively infrequent occurrence (e.g., once per day, once per week, etc.) in which a system state must be frozen or at least changes to system state should be minimized during a traditional backup process (e.g., by users saving their work, exiting out of applications, etc., all of which cause disruption). In contrast, when replicated copies may be made more quickly, backups can be made more quickly, more timely, and more frequently, resulting in a more recent (i.e., less stale) copy of a system state in case a restoration is necessary. Frequent backups begin to resemble a snapshot of a system state. Frequent backups may be referred to herein as "blink" backups.

Changes to system state may be reduced during a blink backup, as described below in greater detail with respect to FIG. 3C. The frequency of blink backups may be configurable by a user or system administrator.

Analogizing to photography, a traditional backup is like a formal holiday family portrait that requires preparation (e.g., interrupting other activities in order to have the portrait taken, and staging—i.e., special poses, lighting, props, etc.). In contrast, embodiments are more like a video recording of a family, with each individual frame of the video representing a separate blink backup (albeit at a relatively slow frame rate compared to a video recording). The blink backup occurs quickly without necessarily requiring undue preparation, and therefore can be made frequently without disrupting operation of the system being blinked.

A blink backup may proceed first by identifying memory resources to be backed-up. For example, suppose an application-specific server is to be backed up. For example, the application-specific server to be backed up may be a virtual server dedicated to accounting functions, the virtual server being hosted on a physical server along with other virtual servers dedicated to other functions respectively such as sales and marketing, engineering department, etc. The server to be backed up customarily will keep a list of application programs executing on itself, along with their respective system resource usage. Embodiments may identify all system resources used by the application-specific server, as indicated by RAM memory ranges allocated to or used by all application programs currently running on the application-specific server being backed-up, address ranges of program code stored in a nonvolatile memory (e.g., storage media such as hard disk, solid-state drive (SSD), flash drive, NAND memory, non-volatile RAM, etc.), operating system configuration, and so forth. Embodiments may perform this collection as a high-priority data collection task, in order to minimize state or data changes to other application programs running on the application-specific server while the collection is taking place. The data collection task does not need to report its own memory usage.

Next, embodiments may retrieve the memory contents indicated by the identification task. Embodiments may then encode and store the memory contents in accordance with process 500 of FIG. 5A, described below in greater detail.

In some embodiments, a replicated copy may be generated by request from a source external to the system being replicated (e.g., a "pull" basis). In other embodiments, a replicated copy may be generated at a time determined by the system being replicated (e.g., a "push" basis). A push basis is similar to a scheduled backup.

Embodiments in accordance with the present disclosure also provide an ability to repurpose a computer hardware architecture upon short notice. For example, suppose that a web hosting company hosts several disparate web sites of interest, e.g., an e-commerce web site like Amazon™ using an average of 200 servers, an online trading web site like E-Trade™ using an average of 100 servers, and so forth. Further suppose that they use the same or similar computer hardware architecture constructed from standard components. The software components may be different, e.g., the e-commerce web site may be based upon an open-source operating system like Linux™, and the online trading web site may be based upon a commercial operating system like Microsoft Windows™. Utilization may vary over time, such that when one system is highly utilized the other system may be lightly utilized, and vice versa. In such a scenario, embodiments may quickly repurpose some servers from one web site to another. For example, if in the middle of a weekday the e-commerce web site is not busy but the online trading web site is busy, some number of servers (e.g., 40 servers) could be repurposed from e-commerce to online trading. Conversely, on a weekday evening when the e-commerce web site is busy but the online trading web site is not busy, some number of servers (e.g., 50 servers) could be repurposed from the online trading web site to the e-commerce web site. The repurposing may also be referred to as personality swapping.

For a server being repurposed from purpose "A" to purpose "B", repurposing may involve first copying or cloning a system state of a server currently devoted to purpose "B". The system state may include all memory currently being used, the operating system and all software currently executing, and so forth. Optionally, the current system state of the server currently devoted to purpose "A" but which will be repurposed may be saved for later restoration. Next, the system state cloned from purpose "B" will be restored on the server that was formerly devoted to purpose "A", thereby substantially instantaneously repurposing that server to purpose "B".

When repurposing, purpose "A" and purpose "B" may be substantially any server-based application, for either the same enterprise or different enterprises. For example, for a single enterprise such as a major toy retailer, purpose "A" may be sales systems that are in most demand before Christmas, and purpose "B" may be accounting systems that are in most demand at the end of the fiscal year.

Similarly, embodiments in accordance with the present disclosure may increase system capacity by repurposing servers from a spare status to an active status for a particular purpose. A spare status may be, e.g., a blank system that is populated with hardware but does not have usable software or data installed.

Embodiments in accordance with the present disclosure may facilitate combinations of system images. For example, a base system image may represent the operating system and/or certain computing infrastructure for the operating system, e.g., uncustomized servers such as a web server, a mail server, and so forth. The base system image may then be merged (i.e., combined) with a custom image, which may represent system-specific customizations of the uncustomized servers, e.g., user accounts, histories, preferences, macros, specialized application programs, and so forth. Conversely, system blinks may be able to blink the customizations separately from the base system image, allowing the customizations to be backed up on a different schedule or with less latency compared to a backup of the base system image.

Figure 3A:
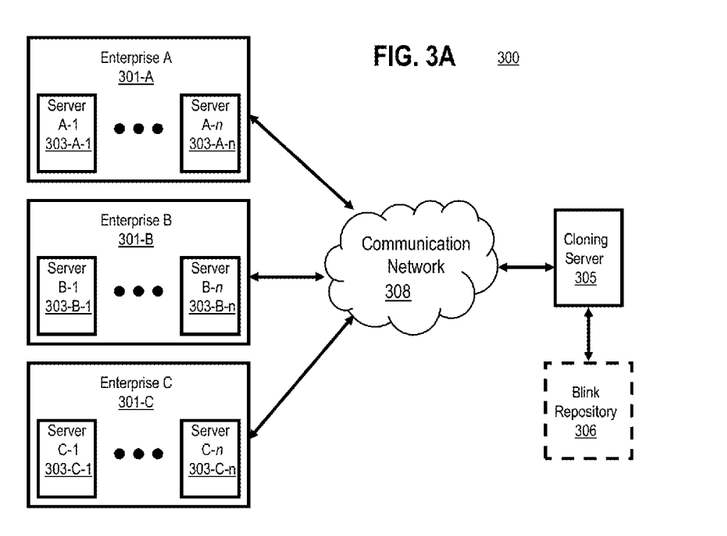
FIG. 3A illustrates a system in accordance with an embodiment of the present disclosure.

FIG. 3A illustrates a system 300 in accordance with an embodiment of the present disclosure. System 300 may be used to perform fast cloning. System 300 as illustrated includes an enterprise A 301-A, an enterprise B 301-B and enterprise C 301-C. Each enterprise may represent an entire company or organization, e.g., a gaming network, an online merchant, an online brokerage, a stock exchange, etc. System 300 may include fewer or more enterprise networks than depicted in FIG. 3A.

Each enterprise 301-$n$ may include one or more servers, e.g., servers 303-A-1 through 303-A-n for enterprise A 301-A, servers 303-B-1 through 303-B-n for enterprise B 301-B, and servers 303-C-1 through 303-C-n for enterprise C 301-C. Individual servers within an enterprise may be utilized by the enterprise for different functions. For example, if enterprise A 301-A is an online merchant, then server 303-A-1 may be a web server, server 303-A-2 may be devoted to database and inventory management, server 303-A-3 may be devoted to billing and accounting, etc.

Each enterprise 301-$n$ may be communicatively coupled to cloning server 305 through communication network 308. Cloning server 305 may be, e.g., computer system 200 as illustrated in FIG. 2. In operation, cloning server 305 may perform the process embodiments described herein upon external servers 303-$m$-$n$. For example, cloning server 305 may replicate server 303-B-1 onto server 303-B-2, or cloning server 305 may make a blink backup of server 303-C-1, and so forth.

In some embodiments, an optional separate blink repository 306 may store blink backups from one or more servers 303. Without a separate blink repository 306, blink backups may be stored within NV-DIMM memory of cloning server 305.

Figure 3B:
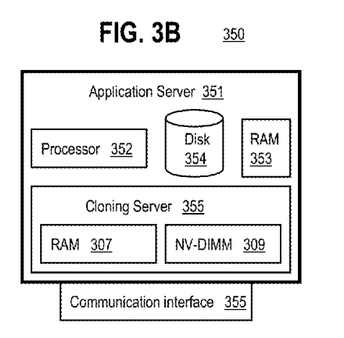
FIG. 3B illustrates another system in accordance with an embodiment of the present disclosure.

FIG. 3B illustrates a system 350 in accordance with an embodiment of the present disclosure. System 350 may be used to perform fast cloning of an application server 351 without the need for external access through a network. System 350 includes application server 351, which may be ordinary functions, for example, a web server, or a database server, or an accounting server, etc. Application server 351 may include a processor 352 coupled to conventional volatile RAM memory 353 and storage media 354 to support operation of application server 351 in its ordinary function. Communication interface 355 may provide communication connectivity between application server 351 and an external communication link (e.g., an Ethernet interface to a WAN or LAN).

However, application server 351 may have further embedded within it the functionality of cloning server 355, supported by conventional volatile RAM memory 307 and NV-DIMM 309. Cloning server 355 may be, e.g., computer system 200 as illustrated in FIG. 2. In operation, cloning server 355 may perform the process embodiments described herein upon application server 351. An advantage of system 350 compared to system 300 is that system 350 does not necessarily need access to a communication network such as communication network 308, because cloning server 355 is embedded within application server 351. Embedding may be accomplished by, e.g., processor 352 of application server 351, which executes code modules for both application server 351 and cloning server 355.

Alternatively, application server 351 may be implemented using computer system 200 as a starting point, then executing by operating system 204 additional software modules that provide the functionality of application server 351.

Figure 3C:
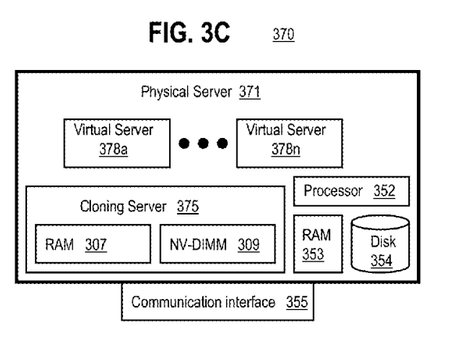
FIG. 3C illustrates a system with a virtual server, in accordance with an embodiment of the present disclosure.

FIG. 3C illustrates a system 370 in accordance with an embodiment of the present disclosure. System 370 includes a physical server 371, which in turn may include a cloning server 375 and one or more of the components of application server 351 (as indicated by like reference numbers), plus one or more virtual servers 378$a$ ... 378$n$ (collectively, virtual servers 378). An individual but nonspecific one of virtual servers 378 may be referred to as virtual server 378. A hypervisor or other virtual machine monitor operating in processor 352 may manage physical server 371 and its resources in order to provide the appearance of virtual servers 378 to remote users, e.g., remote users coupled through communication interface 355. Virtual servers 378 may provide a respective guest operating system ("GOS"), e.g., for the benefit of a user (e.g., a remote user) who is coupled to the respective virtual server 378, and to support execution of application program(s) on the virtual server 378. Memory storage to support a virtual server 378 may be allocated from RAM 353, storage media 354, and/or provided by an external memory device (not illustrated in FIG. 3C).

In some embodiments, upon the occurrence of a blink backup, a virtual server 378, its respective GOS, memory resources and any application programs running on the GOS may temporarily enter a locked or suspended state for the duration of time it takes to perform the blink backup. The locked or suspended state reduces changes to system state or system configuration while the blink backup is taking place. At conclusion of the blink backup, elements that entered a locked or suspended state may automatically return to their normal state.

In some embodiments, a virtual server 378, its respective GOS, memory resources and any application programs running on the GOS may temporarily enter a quiescent state during a blink backup. A quiescent state may continue to execute transactions, but results may be held in resident memory rather than being committed to storage media. In contrast, a server in a hibernation mode may save a memory image to storage media and shut down without executing transactions while in hibernation mode. At conclusion of the blink backup, elements that entered a quiescent state may automatically return to their normal state.

In some embodiments, blink backups may be stored in an external blink repository, similar to blink repository 306, accessible via communication interface 355.

Figure 4:
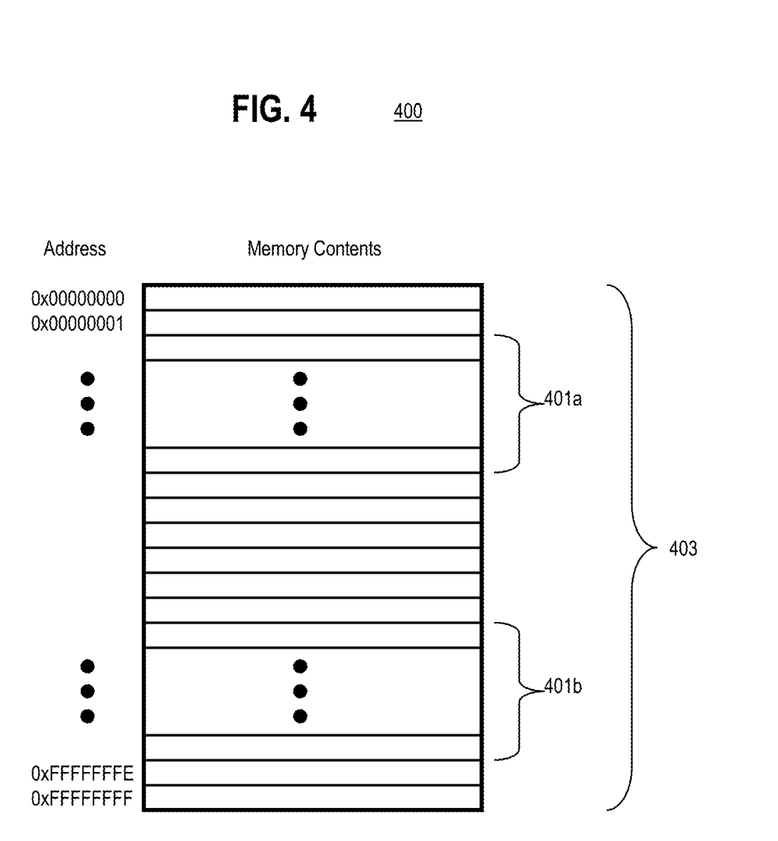
FIG. 4 illustrates a memory model in accordance with an embodiment of the present disclosure.

FIG. 4 illustrates a simplified flat physical address space model. The total amount of physical memory may differ from the amount depicted in FIG. 4. Embodiments in accordance with the present disclosure are able to create a fast clone of an entire address space 403 using processes described herein. Other embodiments are able to make fast clones of one or more portions 401$a$, 401$b$ of the simplified flat physical address space model using processes described herein.

Figure 5A:
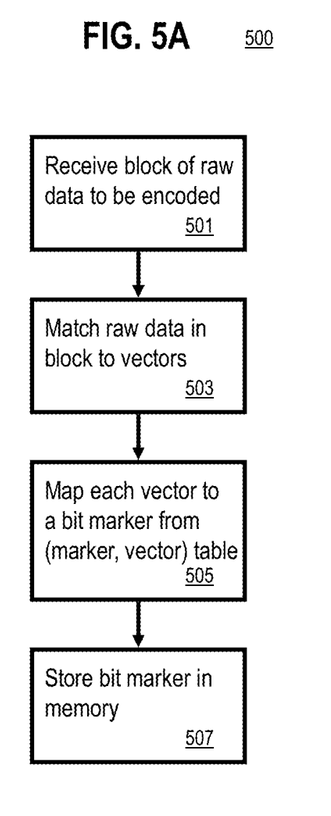
FIG. 5A illustrates a method to encode data in accordance with an embodiment of the present disclosure.

FIG. 5A illustrates an encoding process 500 in accordance with an embodiment of the present disclosure. Process 500 may be performed by operating system 204 and data adaptation module 211.

Process 500 begins at step 501, at which a block of raw data to be stored is received from an application program that intends to store the raw data. The raw data may be in the form of a file, a streaming media, a fixed-size or variable-size block of data, and so forth.

Next, process 500 transitions to step 503, at which portions of the raw data received in step 501 may be mapped or matched to candidate vectors of raw data. Matching the raw data to longer candidate vectors of raw data should produce greater data storage efficiency than matching the raw data to shorter candidate vectors of raw data. The candidate vectors may be stored as a table of (marker, vector) pairs in conventional memory. The goal is to represent each bit or byte in the raw data by at least one vector. Certain raw data bytes such as 0x00 or 0xFF may be deemed to be a default value, and for any raw data bytes equal to the default value, it is optional to represent bytes equal to the default value with a vector.

In step 503, a minimum threshold length limit may exist on the length of a portion of the raw data that will be mapped to candidate vectors of raw data. For example, raw data consisting of only a single byte would be too short to attempt to match to a candidate vector of raw data, because a pointer to the vector of raw data would be longer than the raw data itself. For raw data whose length exceeds the minimum threshold, if the raw data does not match an existing candidate vector of raw data, the raw data may be added as a new vector of raw data.

Next, process 500 transitions to step 505, at which vectors determined in step 503 may be mapped to a respective bit marker from the table of (marker, vector) pairs. The bit marker is a short way to refer to the associated vector.

Next, process 500 transitions to step 507, at which the bit marker from the table of (marker, vector) pairs is stored in memory, such as RAM storage unit 220.

Figure 5B:
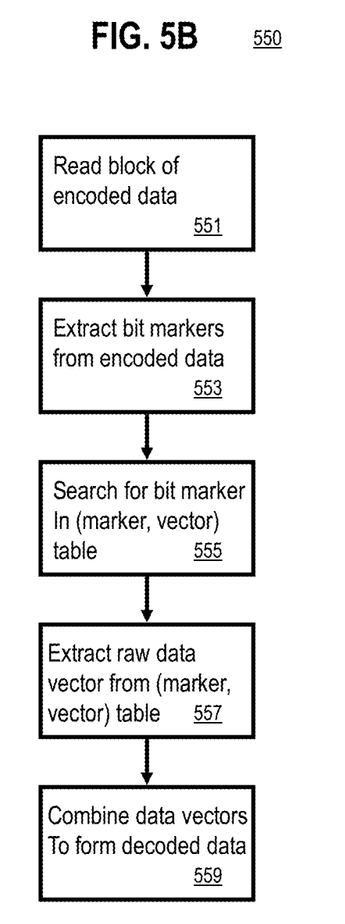
FIG. 5B illustrates a method to decode data in accordance with an embodiment of the present disclosure.

FIG. 5B illustrates a decoding process 550 in accordance with an embodiment of the present disclosure. Process 550 may be performed by operating system 204 and data adaptation module 211.

Process 550 begins at step 551, at which a block of encoded data to be decoded is read from a memory, such as RAM storage unit 220. Addresses may be managed by virtual address adjustment methods and tables, as known to persons of skill in the art.

Next, process 550 transitions to step 553, at which bit markers are extracted from the encoded data.

Next, process 550 transitions to step 555, at which the extracted bit markers from step 553 are searched for in the table of (marker, vector) pairs.

Next, process 550 transitions to step 557, at which a raw data vector is extracted from an entry in the table of (marker, vector) pairs, corresponding to the extracted bit marker from step 553.

Next, process 550 transitions to step 559, at which the extracted raw data vectors from step 557 are combined to form reconstructed decoded data. If the combined raw data vectors do not cover all addresses within an entire expected address range of the reconstructed decoded data, the uncovered addresses may be deemed to take on a default value in the decoded data, e.g., 0x00 or 0xFF bytes.

Figure 6A:
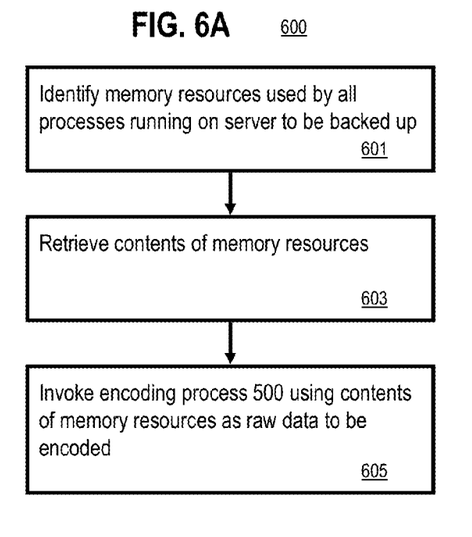
FIG. 6A illustrates a process to perform a blink backup of a source system, in accordance with an embodiment of the present disclosure.

FIG. 6A illustrates a process 600 to perform a blink backup of a source system, in accordance with an embodiment of the present disclosure. Process 600 may be performed by operating system 204 and data adaptation module 211.

Process 600 begins at step 601, at which memory resources to be backed up from the source system are identified. For example, the memory resources may correspond to an entire server, or a virtual server dedicated to a particular function or group (e.g., accounting functions), or correspond to another similar computing system. More particularly, the memory resources may correspond to one or more processes executing on a source system (i.e., a system to be backed-up). A virtual server may be hosted on a physical server along with other virtual servers dedicated to other functions respectively such as sales and marketing, engineering department, etc.

Next, process 600 transitions to step 603, at which the memory contents identified in step 601 are retrieved from the source system (i.e., the system to be backed up). Control of process 600 may then transfer to encoding process 500 for further processing. The memory contents identified in step 601 may be used as the blocks of raw data input to be encoded by process 500. The blocks of raw data may be divided in substantially any convenient way prior to transfer to encoding process 500. For example, blocks of raw data may have substantially uniform block size (e.g., 1 Mbyte per block of raw data), or a block of raw data may correspond to a memory space used by a respective process of the server being backed up, and so forth. In some embodiments, a marker table as described in the '175 Application may be referenced by more than one blink backup.

Figure 6B:
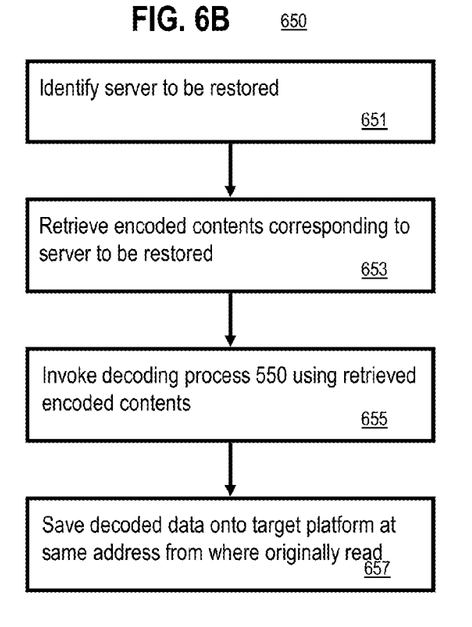
FIG. 6B illustrates a process to restore a system from a blink backup, in accordance with an embodiment of the present disclosure.

FIG. 6B illustrates a process 650 to restore a system from a blink backup, in accordance with an embodiment of the present disclosure. The blink backup may also be referred to as a target system, since it was the target of the backup when the blink backup was made. Process 650 may be performed by operating system 204 and data adaptation module 211.

Process 650 begins at step 651, at which embodiments identify a system to restore.

Next, process 650 transitions to step 653, at which encoded contents corresponding to the server to be restored are retrieved from an encoded memory such as NV-DIMM 309.

Next, process 650 transitions to step 655, at which a decoding process such as decoding process 550 is invoked in order to decode the retrieved encoded contents from step 653.

Next, process 650 transitions to step 657, at which the decoded data is saved into the memory space of a target system. The decoded data may be stored at the same memory addresses as it occupied on the source system.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

We claim:

1. A method to clone a source computing system, comprising the steps of:
   selecting a memory space coupled to the source computing system, the source computing system comprising a main processor;
   retrieving uncoded data from the selected memory space;
   encoding the uncoded data by use of a bit-marker-based encoding process executing on a backup server, wherein a bit marker comprises a multi-bit digital word used to replace a respective unique string of bits in the uncoded data;
   storing encoded data in a protected memory coupled to the backup server, wherein the protected memory is coupled to an energy source to protect the memory from a power interruption, and coupled to a memory interface;
   monitoring, by a second processor in the memory interface, a status of the energy source and a status of the protected memory;
   reporting, by the second processor to the main processor, the monitored status of the energy source and the monitored status of the protected memory;
   retrieving the encoded data from the protected memory; and
   decoding the encoded data onto a target computing system, wherein the target computing system is separate from the source computing system.

2. The method of claim 1, wherein selecting a memory space comprises:
   identifying one or more computing processes executing on the source computing system; and
   selecting a memory space used by each of the one or more identified computing processes.

3. The method of claim 1, wherein selecting the memory space comprises an entire volatile memory address range of the source computing system.

4. The method of claim 1, wherein selecting the memory space comprises a fixed range subset of an entire volatile memory address range of the source computing system.

5. The method of claim 1, wherein the source computing system comprises a virtual server.

6. The method of claim 1, wherein the protected memory coupled to the backup server stores a plurality of source computing system reference images.

7. The method of claim 6, wherein the plurality of source computing system reference images comprises images over time of a single source computing system.

8. The method of claim 6, wherein the plurality of source computing system reference images comprises images of a plurality of source computing systems.

9. The method of claim 1, wherein the clone of the source computing system is created by request from a source external to the source computing system being cloned.

10. The method of claim 1, wherein the clone of the source computing system is created at a time determined by the source computing system being cloned.

11. The method of claim 1, wherein cloning the source computing system is operable to repurpose the target computing system to a different usage.

12. The method of claim 1, wherein cloning the source computing system is operable to restore the target computing system to a backup state.

13. The method of claim 1, wherein cloning the source computing system is operable to repurpose the target computing system from a spare status to an active status.

14. The method of claim 1, wherein selecting a memory space comprises:
   a first memory space comprising a base system image of an uncustomized server; and
   a second memory space comprising system-specific customizations of the uncustomized server.

15. A system to clone a source computing system, comprising:
   a main processor coupled to a memory, the memory providing a memory space for the source computing system;
   a communication interface to support retrieval of uncoded data from the memory space;
   an encoder to encode the uncoded data by use of a bit-marker-based encoding process executing on a backup server, wherein a bit marker comprises a multi-bit digital word used to replace a respective unique string of bits in the uncoded data;
   a storage module to store encoded data in a protected memory coupled to the backup server, wherein the protected memory is coupled to an energy source to protect the memory from a power interruption, and coupled to a memory interface, wherein the memory interface comprises:
      a second processor to monitor the status of the energy source and a status of the protected memory; and
      a communication interface to report to the main processor the monitored status of the energy source and the monitored status of the protected memory;
   a communication interface to support retrieval of the encoded data from the protected memory; and
   a decoder to decode the encoded data onto a target computing system, wherein the target computing system is separate from the source computing system.

16. The system of claim 15, wherein selecting the memory space comprises an entire volatile memory address range of the source computing system.

17. The system of claim 15, wherein selecting the memory space comprises a fixed range subset of an entire volatile memory address range of the source computing system.

18. The system of claim 15, wherein the source computing system comprises a virtual server.

19. The system of claim 15, wherein the protected memory coupled to the backup server stores a plurality of source computing system reference images.

20. The system of claim 19, wherein the plurality of source computing system reference images comprises images over time of a single source computing system.

* * * * *